United States Patent
Nezbed et al.

[11] 3,738,412
[45] June 12, 1973

[54] METHOD FOR SPRAY DRYING COFFEE WHITENER

[75] Inventors: Robert L. Nezbed, Highland Park; William H. Zamzow, Glenview, both of Ill.

[73] Assignee: Kraftco Corporation, New York, N.Y.

[22] Filed: Sept. 8, 1970

[21] Appl. No.: 70,030

[52] U.S. Cl. .............................. 159/48 R, 99/199
[51] Int. Cl. ........ B01d 1/16, B01d 1/00, F26b 3/12
[58] Field of Search .............. 159/48, 4 MS, 4 UM, 159/4 C; 99/199, 200, 203

[56] References Cited
UNITED STATES PATENTS

| | | | |
|---|---|---|---|
| 3,143,428 | 8/1964 | Reimers et al. | 99/141 |
| 3,547,179 | 12/1970 | Hussman | 159/4 CC |
| 1,157,935 | 10/1915 | Gray | 159/48 R X |
| 2,148,355 | 2/1939 | Jakosky et al. | 159/48 R X |
| 2,324,526 | 7/1943 | Morganthaler | 99/71 |
| 2,413,420 | 12/1946 | Stephanoff | 34/10 |
| 2,627,463 | 2/1953 | Meade | 99/199 X |
| 2,977,317 | 3/1961 | Rodis et al. | 252/135 |
| 3,072,486 | 1/1963 | Oakes et al. | 159/48 X |
| 3,514,300 | 5/1970 | Mishkin et al. | 99/199 |

*Primary Examiner*—Norman Yudkoff
*Assistant Examiner*—J. Sofer
*Attorney*—Anderson, Luedeka, Fitch, Even and Tabin

[57] ABSTRACT

Method and apparatus are provided for manufacture of dry particulate food products. In the method, particles of a fluid edible dispersion are provided in the drying chamber of the spray dryer. Circulating air is introduced into the chamber. The circulating air is of a quantity, temperature and humidity sufficient to dry the particles. A fraction of the dried particles is entrained in the circulating air and is subsequently separated to provide a first fraction of particles having a relatively high bulk density. A second fraction of particles is removed from the chamber by gravity and is simultaneously conveyed and cooled to provide a product having relatively low bulk density and rapid sinkability and solubility.

3 Claims, 1 Drawing Figure

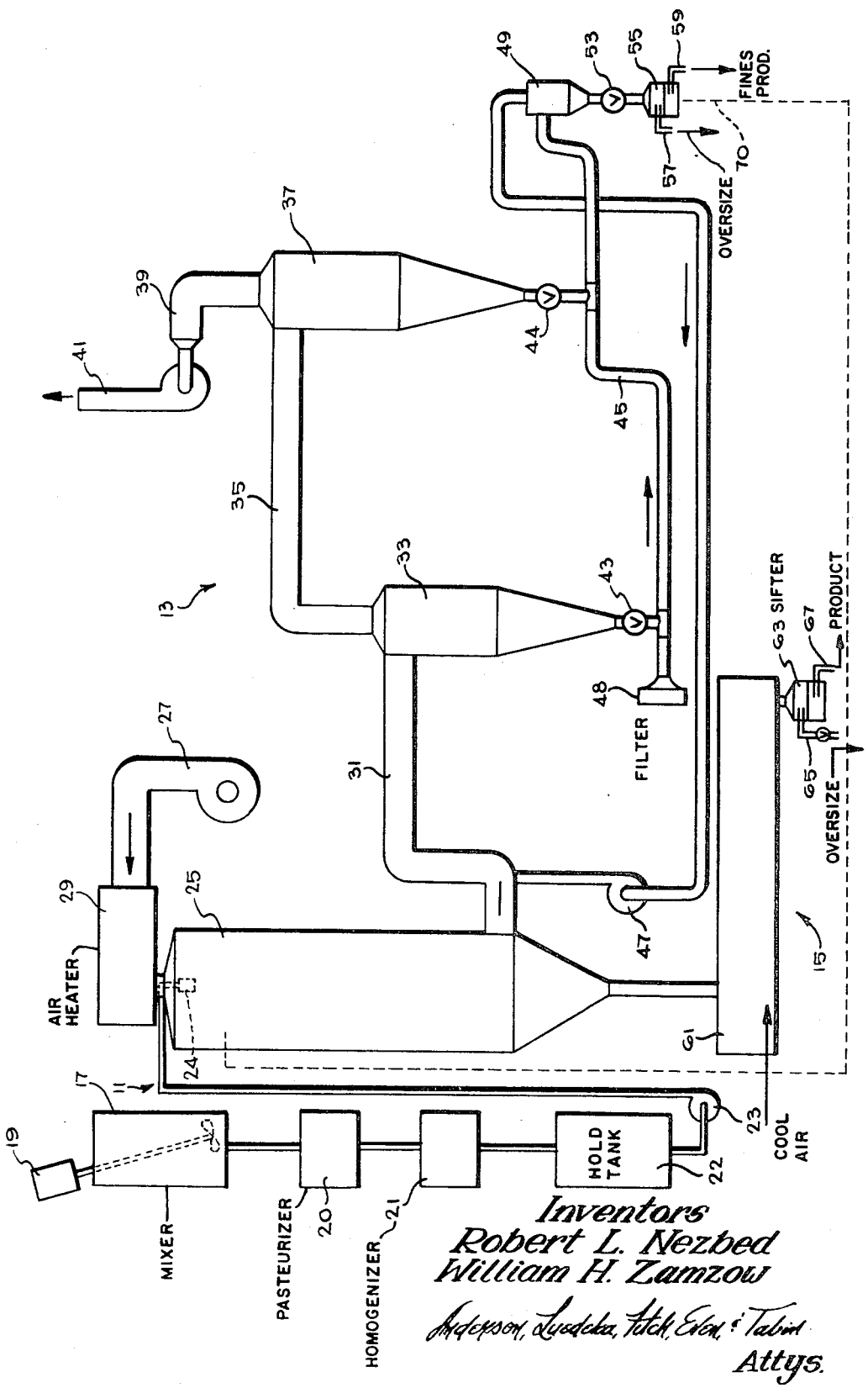

METHOD FOR SPRAY DRYING COFFEE WHITENER

The present invention is generally directed to an improved method and apparatus for preparing dried food products. More particularly, the present invention is directed to a method and apparatus for preparing dried food products by spray drying which have a relatively lower bulk density than has been heretofore available by spray drying.

Many dried fatty emulsion products have been formulated from non-dairy ingredients for use in whitening coffee and other hot beverages. Such dried fatty emulsion products have been commonly referred to as "coffee whiteners." Coffee whiteners usually contain an edible vegetable or animal fat or oil, water soluble sugar solids, a water dispersible protein and emulsifying agents. Coffee whitener formulations must be capable of dispersing completely in a hot liquid such as coffee, with no feathering or free fat appearing on the surface. The coffee whitener must be capable of whitening coffee to an extent comparable to dairy cream, while at the same time contributing a pleasing taste and flavor to the finished drink. A further requirement for household use, however, is that the coffee whitener have good sinking characteristics and be capable of sinking beneath the surface of the hot liquid within a relatively short time. Sinking characteristics are dependent upon bulk density and particle size, and it is desirable to produce coffee whitener having a relatively low bulk density and a relatively large particle size for household use. Coffee whiteners intended for vending machine use may have a higher bulk density due to the manner in which the coffee whitener is added to the dispensing cup during a vending sequence. That is, in the preparation of a hot liquid from a vending machine, the coffee whitener is administered to the bottom of the cup along with a beverage powder before the hot liquid is added to the cup. Therefore, a good sinking characteristics and low bulk density are not so important for coffee whitener to be used in vending operations.

Relatively large particle size and relatively low bulk density are also desirable when producing dried skim milk and other milk products by spray drying. It has been the general practice in the milk industry to treat spray dried skim milk or whole milk so as to agglomerate the spray dried particles so as to provide a product with a relatively larger particle size. The agglomerated product is more readily dispersible in water to provide a reconstituted milk product. It would be desirable to provide a method and apparatus for spray drying milk products so as to provide a dry milk product with a relatively larger particle size and a relatively lower bulk density than has heretofore been possible without post spray drying treatment.

It would also be desirable to provide a method and apparatus for the manufacture of coffee whitener wherein a coffee whitener product may be provided with the desired level of bulk density and with rapid sinkability. It would also be desirable to provide a method and apparatus whereby coffee whitener may be provided having bulk density that is suitable both for vending machines and for household use. It would also be desirable to provide a method and apparatus for the manufacture of coffee whitener wherein a coffee whitener product may be provided which has a low bulk density while at the same time providing a coffee whitener product with a higher bulk density. As used herein, the term "bulk density" refers to the weight of a unit volume of material and is expressed in units of grams per cc.

Accordingly, it is a principal object of the present invention to provide an improved method and apparatus for the manufacture of dry particulate food products. It is another object of the present invention to provide an improved method and apparatus for the manufacture of food products by spray drying whereby a product may be obtained with a desired bulk density and particle size. It is a further object of the present invention to provide an improved method and apparatus for the manufacture of fluid food products whereby a first product may be produced with a relatively high bulk density and a second product produced simultaneously with a relatively low bulk density.

These and other objects of the present invention will become more apparent from the following detailed description and accompanying drawing which is a schematic flow sheet of apparatus useful in the present invention.

Various features of the present invention will be hereinafter particularly described with respect to spray drying a particular fluid food product, e.g., coffee whitener. It should be understood, however, that the method and apparatus of the invention are equally suitable for manufacturing a variety of food products where a larger particle size or lower bulk density is desired. The method and apparatus of the invention are particularly suitable for drying fluid dairy products, such as skim milk, whole milk and whey.

In accordance with various features of the present invention, a liquid coffee whitener emulsion comprising a suitable fat or oil, a water soluble sugar, a water dispersible protein and an emulsifying agent is spray dried in apparatus so as to simultaneously provide a first dried coffee whitener product having a relatively small particle size and a relatively high bulk density, and a second coffee whitener product having a relatively large particle size and a relatively low bulk density. In the method, particles of the fluid coffee whitener emulsion are provided in the drying chamber of the vertical spray dryer. Circulating air is introduced into the chamber and the particles are dried within the chamber. THe circulating air is removed from the chamber and an entrained fraction of dried particles of coffee whitener are removed by the circulating air. The entrained fraction of dried particles are separated from the drying air to provide a first coffee whitener product having a relatively small particle size and a relatively high bulk density. A second fraction of dried coffee whitener particles are removed by gravity from the drying chamber. The second fraction is treated by simultaneously conveying and cooling the particles to provide a second coffee whitener product having a relatively large particle size and a relatively low bulk density.

Now looking particularly at the drawing, the apparatus of the invention is set forth in a schematic flow sheet. The apparatus comprises a spray drying system 11, a first product collection system 13, and a second product collection system 15.

The spray drying system consists of a preparation tank 17, mixer 19, pasteurizer 20, homogenizer 21, hold tank 22, pump 23 and spray nozzle 24. The spray drying system also includes drying chamber 25, blower 27 and heater 29. After a fluid coffee whitener emulsion is prepared in the preparation tank 17, the coffee whitener formulation is pasteurized, homogenized and transferred to the holding tank 22. The coffee whitener formulation is then pumped by means of pump 23 to the spray nozzle 24 which injects particles of fluid coffee whitener emulsion into the spray chamber 25. The blower 27 provides circulating air in the drying chamber 25 for drying the particles, and the air is heated by the heater 29 prior to being introduced into the drying chamber 25.

The first product collection system 13 consists of air duct 31 which connects to a first cyclone 33. The product is removed from the air entering the cyclone 33. The air exits from cyclone 33 through duct 35, and dried product which is removed from the air exits from the cyclone through automatic valve 43. Duct 35 connects to a second cyclone 37. Additional dried product is removed from the air in cyclone 37 and the air exits through duct 39. The air is moved through the first cyclone 33 and the second cyclone 37 by means of blower 41. The dried product removed from the second cyclone 37 exits from the cyclone through automatic dump valve 44 and into product collection duct 45.

The product from the first cyclone and the second cyclone is moved through the product collection duct 45 by means of blower 47. A filter 48 may be provided at the entrance to duct 45 to remove any impurities from incoming air. The product collection duct 45 leads to a third cyclone 49. Air exits from the third cyclone 49 through duct 51 and is recycled to duct 31. The product is removed from the third cyclone 49 through automatic dump valve 53. The product is then passed through sifter 55 so as to remove oversized lumps of product which may have been formed by agglomeration. The oversized product exits from the sifter at outlet 57, while the finished product exits at outlet 59. The principal product may then be collected and packaged into suitable containers (not shown).

The second product collection system 15 consists of a conveyor 61 and sifter 63. The conveyor 61 is provided with cooling means (not shown) which may consist of any suitable cooling apparatus. Cooling may be effected by passing cool air through the conveyor or providing the conveyor with cooling coils so as to cool the product by convection or conduction. The second product is removed from the bottom of the drying chamber 25 by gravity into conveyor 61.

The dried coffee whitener product which exits from conveyor 61 is passed through sifter 63 to remove oversize particles. In this connection, the dried product is substantially less than 16 mesh, and sifter 63 is used for the purpose of removing a relatively few large agglomerated particles. For this reason, sifters 55 and 63 are provided with screens having a mesh size of about 16 or higher. The oversize product is removed from sifter 63 through outlet 65, while the product is removed through outlet 67.

In operation of the present invention, a coffee whitener emulsion is first prepared in the preparation tank 17. Various coffee whitener formulations are known in the art, and such various formulations are not particularly described herein except in the example which follows below. Any of the various coffee whitener formulations may be used in the practice of the present invention. As previously indicated, a coffee whitener formulation includes a vegetable or animal fat or oil, a water dispersible sugar, a water dispersible protein and emulsifying agents.

The coffee whitener formulation is agitated in the preparation tank 17 by the mixer 19 and is thereafter pasteurized, homogenized and transferred to holding tank 22. The coffee whitener formulation which is now an emulsion is then transferred by pump 28 to the spray nozzle 24. Generally, the pump 23 is capable of providing the coffee whitener emulsion to the nozzle 24 at pressures of from about 1,000 psi to about 5,000 psi. Heated air is introduced into the drying chamber of the spray dryer by the blower 27. The air is heated by heater 29 before being introduced into the drying chamber 25. The heated air acts to dry particles of the fluid coffee whitener emulsion which are introduced into the chamber 25 by the nozzle 24. The air and the dried particles progress downwardly through the chamber 25. The air is removed through duct 31 and carries with it entrained particles of dried coffee whitener. Other particles of coffee whitener continue downwardly in the chamber 25 by the action of gravity. The particles which move downwardly to the bottom of the chamber 25 are removed from the chamber by gravity into the conveyor 61.

The relative proportions of dried coffee whitener particles which are entrained by the circulating air and which continue downwardly through the chamber 25 are controlled by the pressure within the chamber 25. In general, as the pressure within the chamber 25 is reduced below atmospheric, a higher proportion of dried particles of coffee whitener will be entrained by the circulating air which exits through duct 31. As the pressure is increased within the chamber 25, a higher proportion of particles of coffee whitener will fall to the bottom of the chamber and be removed by gravity through line 65 containing an automatic valve. As a pressure of from about 0.1 to about 0.25 inches of water vacuum, an approximately equal proportion of the dried particles will be entrained by the circulating air and pass downwardly by gravity to the conveyor 61. Other proportions of high bulk density product to low bulk density product may be obtained by adjusting the pressure within the range of about atmospheric pressure to about 2 inches of water vacuum. It is not generally desirable to establish a pressure within the chamber 25 which is positive with respect to atmospheric pressure. When the pressure within the chamber 25 is positive, there is a tendency to blow dried particles of coffee whitener from the spray drying system into the atmosphere. If higher proportions of low bulk density product are desired, all or part of the dried product having a relatively high bulk density may be reintroduced as a dry powder into chamber 25 as shown by the dotted line 70. The dry powder may be transferred and blown into the chamber 25 by any suitable means.

The entrained particles of dried coffee whitener which are removed from the chamber 25 through duct 31 by the exiting circulating air are removed from the circulating drying air by the cyclones 33 and 37. The coffee whitener product, which is removed by the cyclones, is transferred through automatic valves 43 and 44 to duct 45, where the dried particles are conveyed by air to the final product removal cyclone 49. The product removed by cyclone 49 is transferred through automatic valve 53 to sifter 55. Oversize particles are removed by sifter 55 through outlet 57. The finished product is removed through outlet 59 and may be then packaged into suitable containers.

The product obtained from the sifter 55 has a bulk density within the range of from about 0.60 to about 0.70 grams per cc. The bulk density is determined by placing a known weight of the product in a container and packing the product by vibration until the volume is constant. The product obtained from the sifter 5 is suitable for use in vending machines, but does not have particularly good properties with respect to sinking when placed on top of a hot liquid beverage. While not wishing to be bound by any theory, it is believed that the relatively small particle size product with relatively high bulk density is the result of air conveying of the product through duct 45. It is believed that air conveying of the dried particles of coffee whitener removed from cyclones 33 and 37 results in abrasion of the particles and reduction in particle size.

The second fraction of coffee whitener particles are removed from the bottom of the chamber 25 by gravity into conveyor 61. The dried particles are conveyed by conveyor 61 and are simultaneously cooled. It is important that the dried particles being conveyed by conveyor 61 be kept in slight relative motion with respect to each other so that substantial agglomeration does not occur during the conveying step. A preferred method of conveying the dried particles is by means of vibratory conveyors. Other suitable means for conveying the particles is by means of fluidized bed conveyors or by relatively low velocity air conveying. Air conveying is suitable for conveying the particles so long as the particles are not subjected to any substantial rapid change in direction while the particles are being conveyed.

Cooling of the particles during conveying is required to prevent substantial agglomeration of the particles during conveying and to reduce the temperature of the particles to a level where any substantial deterioration of the product by heat effects does not occur. Cooling may be effected by passing air over the particles within the conveyor 61. Cooling may also be effected by surrounding the conveyor with cooling coils and cooling the particles through convection or conduction. Other suitable means for effecting cooling of the particles during conveying within conveyor 61 will be readily apparent to one skilled in the art.

Cooling is sufficient to reduce the product temperature by at least 20°F as the product is being conveyed. Preferably cooling is sufficient to reduce the product temperature by from about 30°F to about 120°F. In this connection, the outlet temperature of the circulating air is desirably maintained within the range of from about 190°F to about 210°F. If the outlet air temperature is above about 210°F the product may be harmed by burning. If the outlet air temperature is below about 190°F the moisture level of the product is too high and substantial sticking of the product to the walls of the chamber occurs. When the above indicated range for outlet air temperature is maintained, the product temperature as it exits from the chamber 25 by gravity is from about 175°F to about 185°F.

The coffee whitener product obtained by gravity from the bottom of the chamber 25 has a relatively large particle size and a relatively low bulk density. In this connection, a comparison of the particle size of the coffee whitener products obtained from sifter 63 and sifter 55 is presented below. The product obtained from sifter 63 is designated low density, while the product obtained from sifter 55 is designated as high density.

| Screen Size | | Accumulative Percent by Weight | |
|---|---|---|---|
| | | Low Density | High Density |
| On | 60 | 58.63 | 28.3 |
| " | 100 | 80.7 | 58.3 |
| " | 140 | 90.6 | 75.8 |
| " | 170 | 94.0 | 80.0 |
| " | 200 | 97.4 | 87.2 |
| Minus 200 | | 2.6 | 12.8 |

The above tabulation of relative particle sizes of the low density product obtained by gravity from the chamber and the high density product obtained from entrained product carried by the air leaving the chamber is intended to be representative only. Absolute measurement of particle sizes of dried coffee whitener particles is extremely difficult in that the particles tend to break upon being forced through the screen. Therefore, the above comparison is intended to be representative and relative only, and is not intended to be an absolute measure of the particle size distribution of the two coffee whitener fractions obtained by the method of the present invention.

The low density product obtained by gravity from the bottom of chamber 25 generally has a bulk density of from about 0.40 to about 0.55 grams per cc., the bulk density being measured as previously described. The low density coffee whitener product has extremely good sinking and dispersion characteristics when the product is added to the top of a hot fluid beverage. In general, the product sinks beneath the surface of the hot fluid beverage within a time period of about 10 seconds. This is considered an acceptable sinking time for a coffee whitener product to be used in the household.

The following example further illustrates various features of the present invention, but is not intended to limit the scope of the invention, which is defined in the appended claims.

EXAMPLE

A coffee whitener formulation is prepared which has the following ingredients at the indicated levels:

| Ingredient | Weight Lbs. |
|---|---|
| Coconut Fat (92°) | 2,020 |
| Emulsifier | 240 |
| Corn syrup solids (24 DE) | 3,200 |
| Sodium caseinate | 220 |
| Salts | 160 |
| Water | 2,500 |

The above ingredients are added to the preparation tank 17 and are agitated by mixer 19 and homogenized so as to provide an emulsion. The emulsion is then transferred to spray nozzle 24 by pump 23 at a pressure of 4,000 psi. The emulsion is sprayed into chamber 25 at a rate of 6 gallons per minute. Air, which has been heated to a temperature of 335°F is then introduced into chamber 25 at a rate of 25,500 cubic feet per minute. The pressure within the chamber 25 is adjusted by means of a draft control at the outlet of blower 41. The outlet air temperature is 198°F.

The air, after passing through chamber 25, exits from chamber 25 through duct 31. About half of the dried particles of coffee whitener are entrained in the air which exits through duct 31. The dry particles of coffee whitener which are removed from the chamber by means of the air exiting through duct 31 are removed from the air by means of cyclones 33, 37 and 49. A product is obtained from cyclone 49 which has a bulk density of 0.65 grams per cc. The total coffee whitener product obtained from cyclone 49 represents 48.3 percent by weight (dry basis) of the weight of the starting materials.

A second product is removed by gravity from the bottom of chamber 25. The product is transferred by means of a vibratory conveyor 61 while cool air is passed over the surface of the dried coffee whitener on conveyor 61. The product exits from the chamber 25 at a temperature of 90°F while being conveyed by conveyor 61. The coffee whitener product is removed from conveyor 61 and passes to sifter 63. A coffee whitener product is obtained from sifter 63 which has a bulk density of 0.49 grams per cc. The coffee whitener product obtained from sifter 63 represents 51.2 percent by weight (dry basis) of the starting dry materials. THe sinking time of the low bulk density product in hot coffee is 7 seconds and no particles were left on the surface of the coffee. The sinking time of the high bulk density product in hot coffee is 15 seconds and there is a residual scum of particles remaining on the surface.

The method and apparatus of the present invention provide a means for drying a coffee whitener formulation so as to obtain a fraction of the formulation having a relatively high bulk density and a second fraction of the formulation having a relatively low bulk density. The proportions of the two fractions produced may be adjusted as desired. The low bulk density product is not readily provided by direct spray drying with conventional spray drying apparatus. It has heretofore been considered necessary to include an agglomeration step in order to obtain a coffee whitener formulation and other dairy products having a bulk density as low as that provided by the method of the invention.

What is claimed is:

1. A method for drying liquid coffee whitener so as to simultaneously provide a first product having a relatively high bulk density and a second product having a relatively low bulk density and good sinking characteristics, comprising providing particles of a liquid coffee whitener dispersion in the drying chamber of a spray dryer, introducing circulating air into said chamber, said air being of a quantity, temperature and humidity sufficient to dry said particles and provide an outlet air temperature in the range of from about 190°F to about 210°F, entraining a fraction of said dried particles in said circulating air and removing said circulating air containing a first fraction of particles from said drying chamber, separating said first fraction of particles having a relatively high bulk density of from about 0.60 to about 0.70 grams per cc from said circulating air, removing from said drying chamber a second fraction of coffee whitener particles having a bulk density of from about 0.40 to about 0.55 grams per cc by gravity and simultaneously cooling while conveying only said second fraction to provide a packageable product having relatively low bulk density and rapid sinkability and solubility, said conveying being effected by vibratory conveying so that said dried particles of said second fraction are maintained in slight relative motion in respect to each other and said cooling during said conveying being sufficient to reduce the temperature of said second fraction by at least about 20°F.

2. A method in accordance with claim 1 wherein at least a part of said first fraction of dried particles is recycled to said drying chamber as dried particles.

3. A method in accordance with claim 1 wherein said drying chamber is maintained at a pressure of from about atmospheric to about 2 inches of water vacuum during said drying.

* * * * *